(12) United States Patent
Cabello et al.

(10) Patent No.: US 9,365,296 B2
(45) Date of Patent: Jun. 14, 2016

(54) TRANSFER TUBE FOR A RAM AIR FAN (RAF) ASSEMBLY

(71) Applicant: HAMILTON SUNDSTRAND CORPORATION, Windsor Locks, CT (US)

(72) Inventors: Brian Cabello, Windsor, CT (US); William R. Fiske, Springfield, MA (US); Danielle Mansfield-Marcoux, Enfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 315 days.

(21) Appl. No.: 13/889,619

(22) Filed: May 8, 2013

(65) Prior Publication Data

US 2014/0332623 A1 Nov. 13, 2014

(51) Int. Cl.
*B64D 41/00* (2006.01)

(52) U.S. Cl.
CPC .................................. *B64D 41/007* (2013.01)

(58) Field of Classification Search
CPC ......... B64D 41/007; F16L 13/08; F16L 23/00
See application file for complete search history.

(56) References Cited

U.S. PATENT DOCUMENTS

| 2006/0061221 | A1 | 3/2006 | McAuliffe et al. |
| 2012/0011878 | A1 | 1/2012 | Hipsky |
| 2012/0014784 | A1* | 1/2012 | Hipsky et al. ................. 415/177 |
| 2013/0022443 | A1 | 1/2013 | Beers et al. |

OTHER PUBLICATIONS

AWS Brazing Handbook. American Welding Society (2007). pp. 1-66, 137-143, 609-621.*

* cited by examiner

*Primary Examiner* — Timothy D Collins
*Assistant Examiner* — Michael Kreiner
(74) *Attorney, Agent, or Firm* — Cantor Colburn LLP

(57) ABSTRACT

A transfer tube including a tube member extends from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

20 Claims, 6 Drawing Sheets

TRANSFER TUBE FOR A RAM AIR FAN (RAF) ASSEMBLY

BACKGROUND OF THE INVENTION

Exemplary embodiments pertain to the art of aircraft systems and, more particularly, to a transfer tube for a ram air fan (RAF) assembly.

Fans are often used to move air. Fans may, for example, move air through heat exchangers of air conditioning packs for aircraft. The air moved by the fans cools the heat exchangers. Such fans within aircraft are often ram air fans. In flight, air is introduced into a ram air device to drive the fans. When the aircraft is stationary, electric motors drive the ram air fans to create the desired airflow. Electrical energy is passed to the electric motors through wires or conductors. The conductors pass through a transfer tube that provides a passage between an externally mounted terminal box and the electric motors.

BRIEF DESCRIPTION OF THE INVENTION

Disclosed is a transfer tube including a tube member extending from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

Also disclosed is a ram air fan (RAF) assembly including a housing having an outer surface and an inner surface that defines an interior portion. A fan housing including a fan motor is arranged within the interior portion, and a transfer tube extends between the outer surface and the fan housing. The transfer tube includes a tube member extending from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

Further disclosed is an aircraft including a fuselage extending from a nose portion to a tail portion through a body portion. First and second wings project from the body portion, and a ram air fan (RAF) assembly is mounted within the fuselage. The RAF assembly includes a housing having an outer surface and an inner surface that defines an interior portion, a fan housing including a fan motor arranged within the interior portion, and a transfer tube extending between the outer surface and the fan housing. The transfer tube includes a tube member extending from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
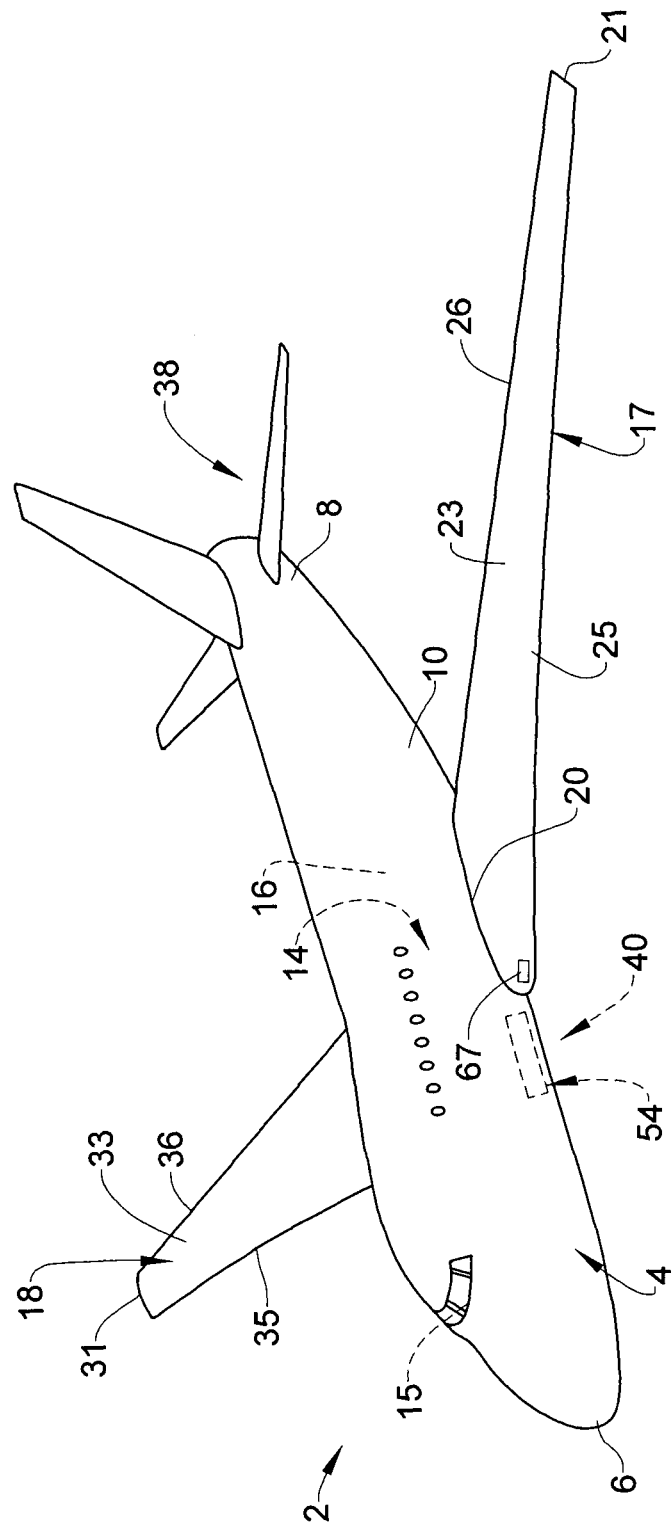
FIG. 1 is a perspective view of an aircraft having a transfer tube for a ram air fan (RAF) assembly in accordance with an exemplary embodiment

An aircraft, in accordance with an exemplary embodiment, is indicated generally at 2 in FIG. 1. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38.

Figure 2:
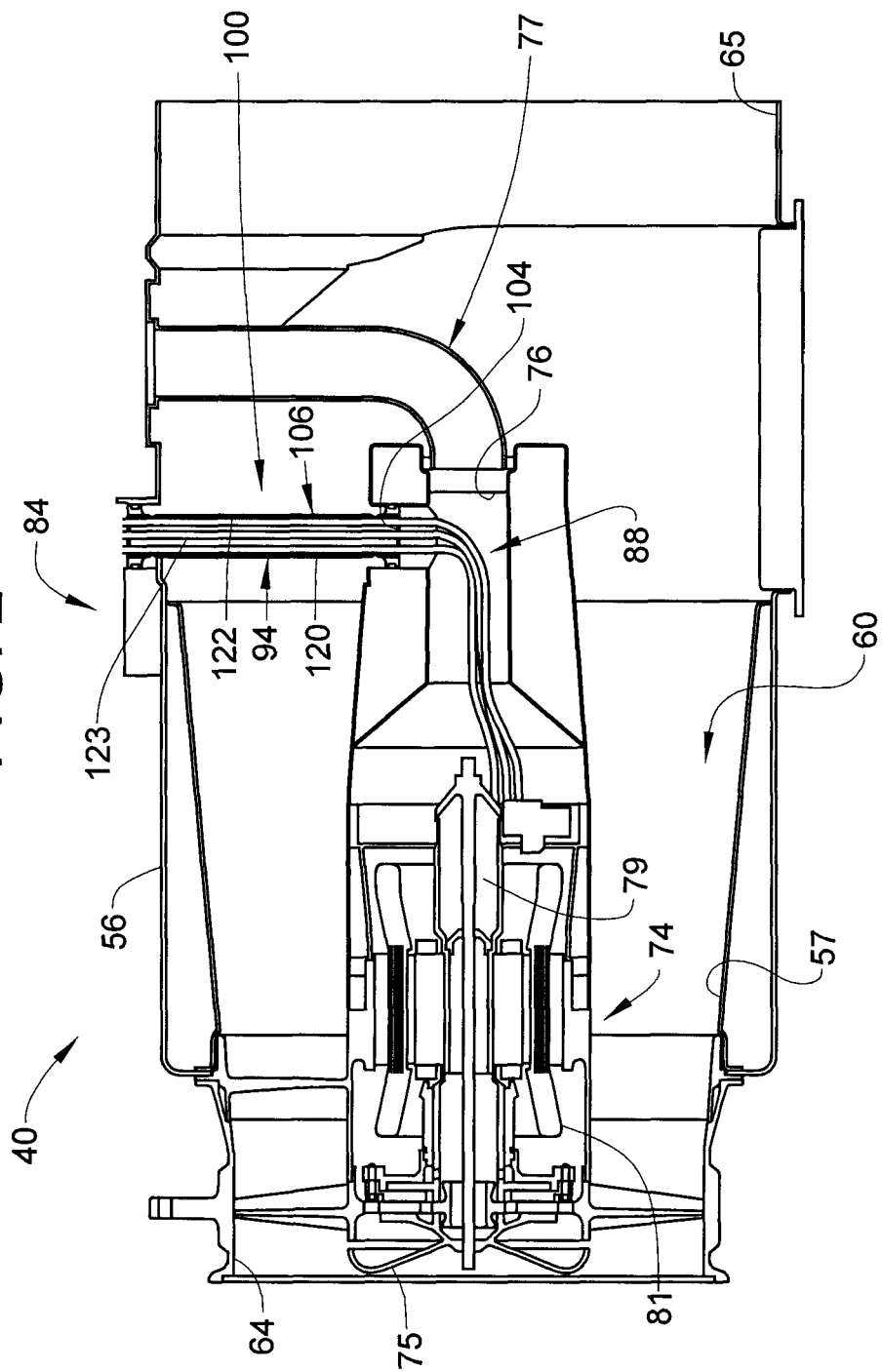
FIG. 2 is a cross-sectional side view of the RAF assembly of FIG. 1 including the transfer tube in accordance with an exemplary embodiment.

Aircraft 2 includes a ram air fan (RAF) assembly 40 mounted within fuselage 4. As shown in FIG. 2, and with reference to both FIG. 1 and FIG. 2, RAF assembly 40 includes a housing 54 including an outer surface 56 and an inner surface 57 that defines a diffuser. Housing 54 includes an interior portion 60, an inlet 64 and an outlet 65. Inlet 64 receives an airflow via an opening 67 formed in first wing 17. It should be understood that opening 67 may also be arranged in other locations along fuselage 4. Outlet 65 delivers a conditioned airflow to, for example, crew compartment 15 and passenger compartment 16. The conditioned airflow may also be delivered to other areas in aircraft 2.

RAF assembly 40 includes a fan housing 74 arranged within interior portion 60. Fan housing 74 includes an inlet portion 75 and an outlet portion 76. Outlet portion 76 is fluidically connected to outlet 65 through a motor bearing cooling tube 77. Fan housing 74 supports a fan motor 79 operatively connected to a fan assembly 81. Fan motor 79 is electrically connected to a terminal block 84 through a plurality of conductors 88. Conductors 88 selectively deliver electrical energy to fan motor 79 to operate fan assembly 81 and generate an airflow. Conductors 88 pass from terminal block 84 to fan motor 79 through a transfer tube 94. Transfer tube 94 extends between terminal block 84 and fan housing 74.

Figure 3:
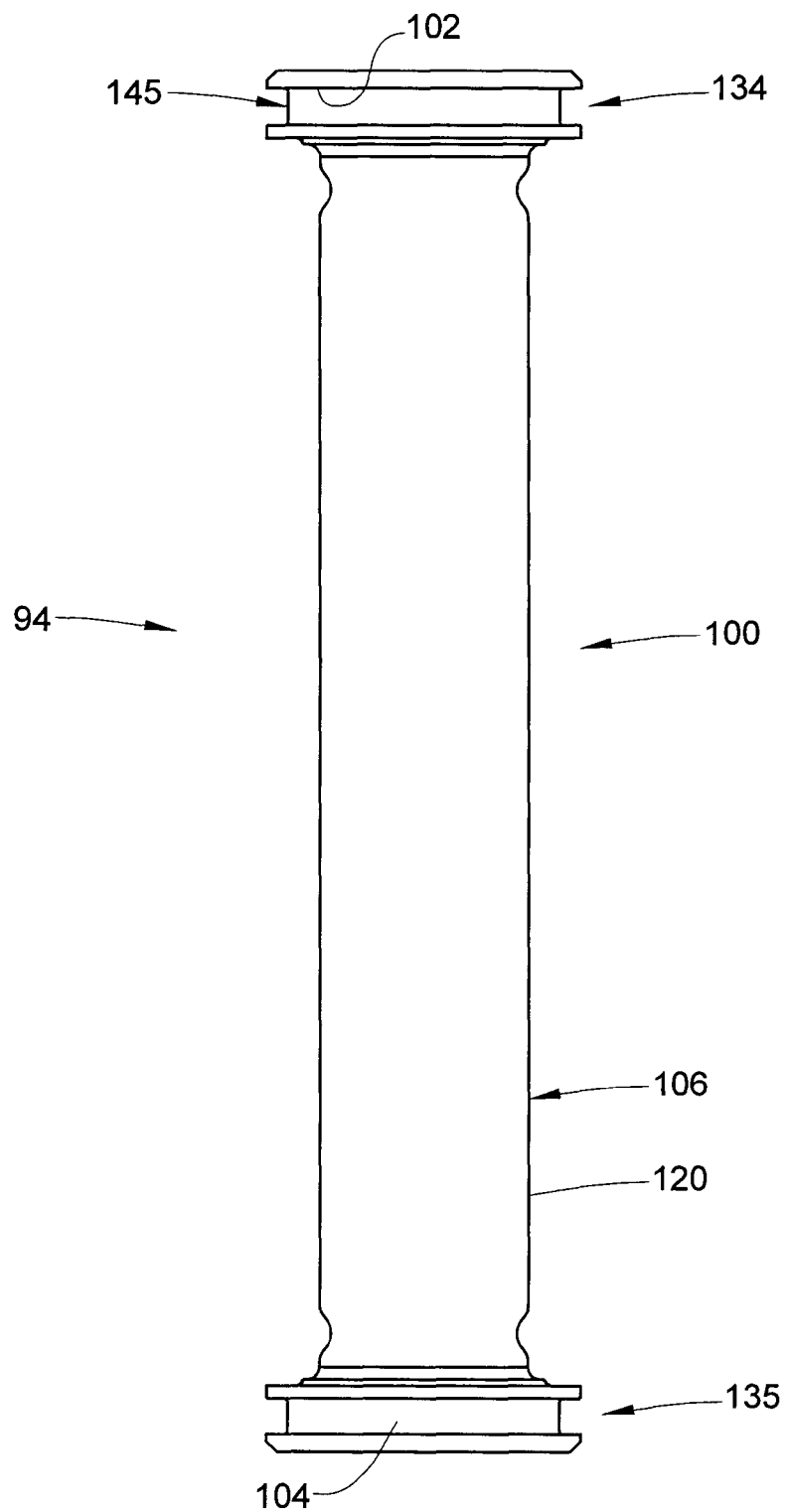
FIG. 3 is a perspective view of the transfer tube in accordance with an exemplary embodiment.

As best shown in FIG. 3, transfer tube 94 includes a tube member 100 that extends from a first end 102 to a second end 104 through an intermediate portion 106. Intermediate portion 106 includes an outer surface 120 and an inner surface 122 that defines a conduit 123. First end 102 includes a first end face 125 (FIG. 4) and second end 104 includes a second end face (not separately labeled). A first flange 134 is arranged at first end 102 and a second flange 135 is arranged at second end 104. First and second flanges 134 and 135 provide an interface between transfer tube 94 and corresponding ones of housing 54 and fan housing 74.

Figure 4:
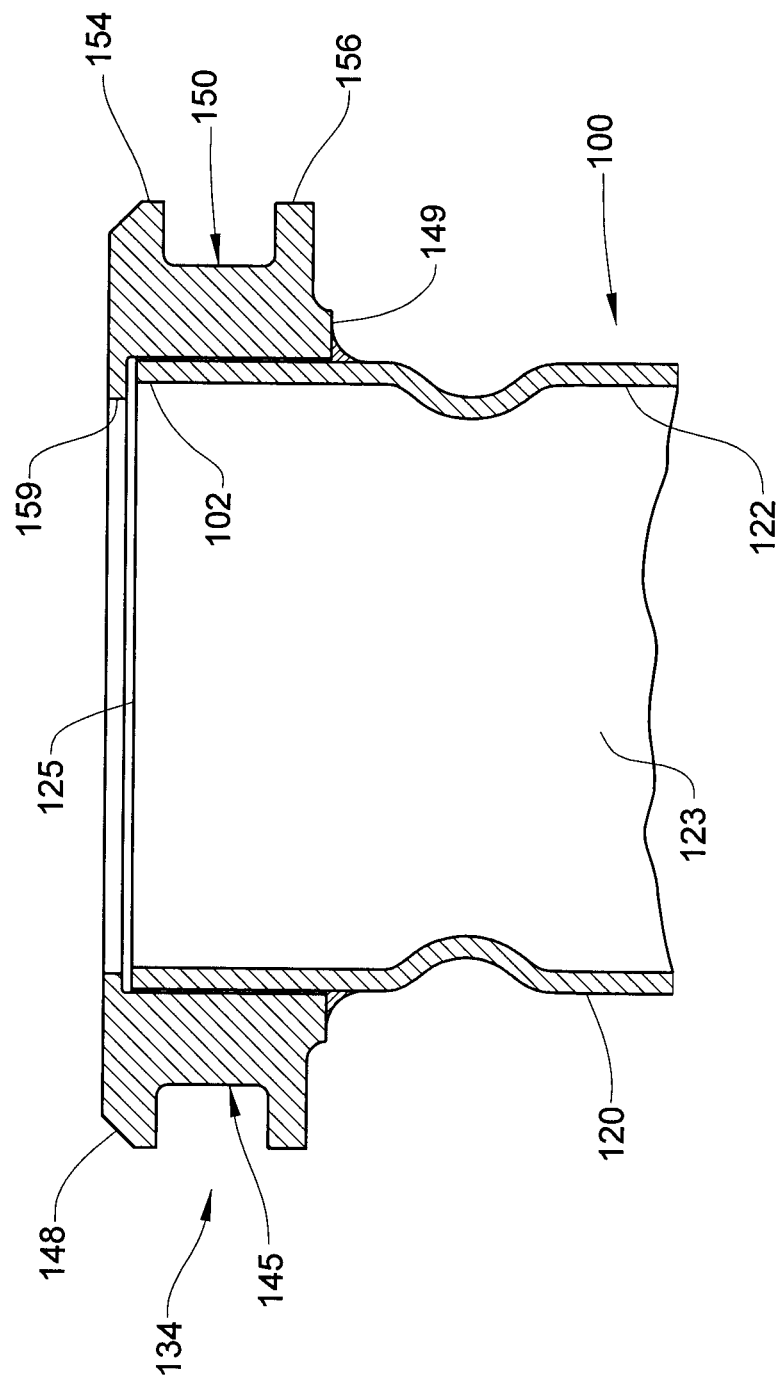
FIG. 4 is a cross-sectional view of an end of the transfer tube of FIG. 3.
Figure 5:
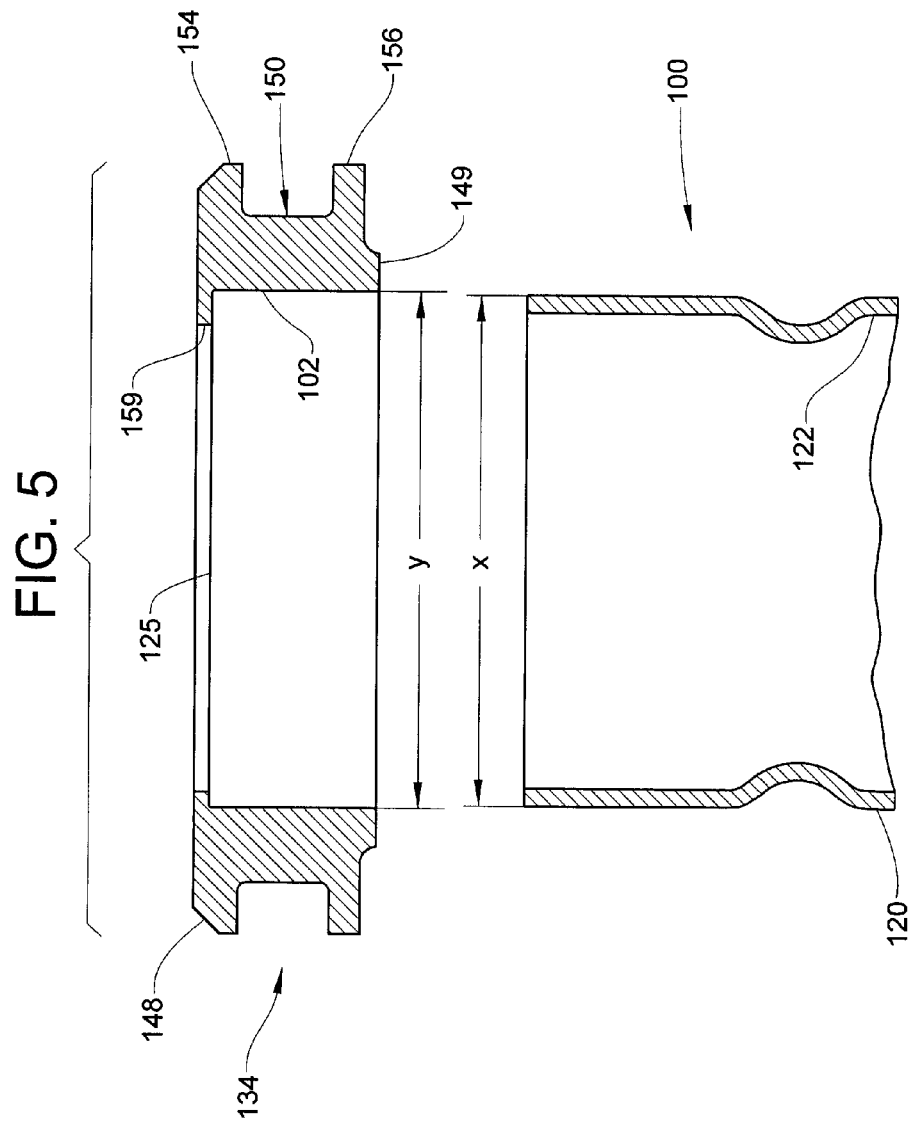
FIG. 5 is an exploded view of the end of the transfer tube of FIG. 4.
Figure 6:
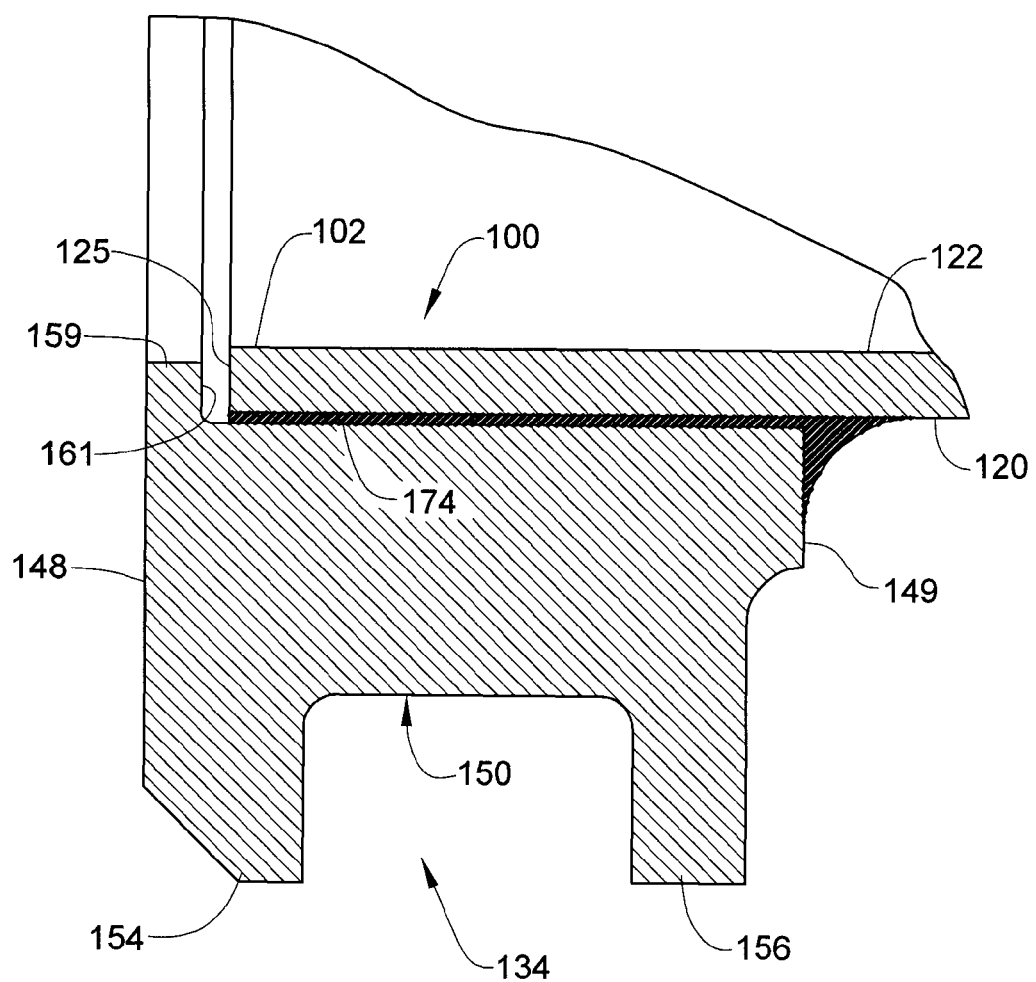
FIG. 6 is a detailed view of a portion of the transfer tube illustrated in FIG. 4.

At this point, a detailed description will follow with reference to FIGS. 4-6 in describing first flange 134 with an understanding that second flange 135 includes similar structure. First flange 134 includes a flange body 145 that extends from a first end portion 148 to a second end portion 149 through an intermediate section 150. A first annular rib 154 is arranged at first end portion 148 and a second annular rib 156 is arranged proximate to second end portion 149. An annular lip 159 projects radially inwardly at first end portion 148. First flange 134 includes an inner surface 161 that is bonded to tube member 100.

Outer surface 120 of tube member 100 defines an outer diameter "x". Inner surface 161 of first flange 134 defines an inner diameter having a dimension "y". In accordance with an exemplary embodiment, dimension "x" is between about 0.010-inch (0.0254-cm) and about 0.030-inch (0.0762-cm) smaller than dimension "y". In accordance with an aspect of the exemplary embodiment, dimension "x" is about 0.020-inch (0.0508-cm) smaller than the inside diameter of first flange 134. In accordance with another aspect of the exemplary embodiment, dimension "y" is between about 1% and about 3.5% larger than dimension "x". In accordance with one example, dimension "x" is between about 1.245-inch (3.162-cm) and about 1.255-inch (3.187-cm). In accordance with another example, dimension "x" is about 1.250-inch (3.175-cm). In accordance with yet another example, dimension "y" is between about 1.265-inch (3.213-cm) and about 1.275-inch (3.239-cm). In accordance with still yet another example, dimension "y" is about 1.270-inch (3.225-cm).

At this point it should be understood that tube member 100 includes an outer diameter that is smaller than an inner diameter of flange 134. In this manner, a gap (not separately labeled) is formed between outer surface 120 and inner surface 161 when flange 134 is mounted to first end 102. The gap provides an area that accommodates an introduction of a metallurgical bonding material 174 that joins flange 134 to first end 102. In accordance with an aspect of the exemplary embodiment, metallurgical bonding material 174 includes a brazing material. In accordance with another aspect of the exemplary embodiment, first end 102 is devoid of any metallurgical bonding material 174. The particular sizing of tube member 100 and flange 134, coupled with the use of a metallurgical bonding material, provides a resilient connection that withstands vibration and other environmental factors associated with RAF assembly 40.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A transfer tube comprising:
    a tube member extending from a first end to a second end through an intermediate portion having an outer surface and an inner surface, the outer surface having an outside diameter; and
    a flange mounted at one of the first and second ends of the tube member, the flange including a flange body extending from a first end portion to a second end portion through an intermediate section having an outer surface and an inner surface, the inner surface defining an inside diameter, wherein the outside diameter of the tube member is between about 0.010-inch (0.0254-cm) and about 0.030-inch (0.0762-cm) smaller than the inside diameter of the flange, and wherein the flange further includes a first annular rib arranged at the first end portion, a second annular rib arranged proximate to the second end portion, and an annular lip projecting radially inwardly at the first end portion.

2. The transfer tube according to claim 1, wherein the outside diameter of the tube member is about 0.020-inch (0.0508-cm) smaller than the inside diameter of the flange.

3. The transfer tube according to claim 1, wherein the inside diameter of the flange is between about 1% and about 3.5% larger than the outside diameter of the tube member.

4. The transfer tube according to claim 1, wherein the outside diameter of the tube member is between about 1.245-inch (3.162-cm) and about 1.255-inch (3.187-cm).

5. The transfer tube according to claim 4, wherein the outside diameter of the tube member is about 1.250-inch (3.175-cm).

6. The transfer tube according to claim 1, wherein the inside diameter of the flange is between about 1.265-inch (3.213-cm) and about 1.275-inch (3.239-cm).

7. The transfer tube according to claim 6, wherein the inside diameter of the flange is about 1.270-inch (3.225-cm).

8. The transfer tube according to claim 1, further comprising: an amount of metallurgical bonding material arranged between the inner surface of the flange and the outer surface of the tube member, the first end of the tube member and the first end portion of the flange being devoid of metallurgical bonding material.

9. The transfer tube according to claim 8, wherein the metallurgical bonding material comprises a brazing material.

10. A ram air fan (RAF) assembly comprising:
    a housing including an outer surface and an inner surface that defines an interior portion;
    a fan housing including a fan motor arranged within the interior portion; and
    a transfer tube extending between the outer surface and the fan housing, the transfer tube comprising:
        a tube member extending from a first end to a second end through an intermediate portion having an outer surface and an inner surface, the outer surface having an outside diameter; and
        a flange mounted at one of the first and second ends of the tube member, the flange including a flange body extending from a first end portion to a second end portion through an intermediate section having an outer surface and an inner surface, the inner surface defining an inside diameter, wherein the outside diameter of the tube member is between about 0.010-inch (0.0254-cm) and about 0.030-inch (0.0762-cm)

smaller than the inside diameter of the flange, and wherein the flange further includes a first annular rib arranged at the first end portion, a second annular rib arranged proximate to the second end portion, and an annular lip projecting radially inwardly at the first end portion.

11. The RAF assembly according to claim 10, wherein the outside diameter of the tube member is about 0.020-inch (0.0508-cm) smaller than the inside diameter of the flange.

12. The RAF assembly according to claim 10, wherein the outside diameter of the tube member is between about 1.245-inch (3.162-cm) and about 1.255-inch (3.187-cm).

13. The RAF assembly according to claim 10, wherein the inside diameter of the flange is between about 1.265-inch (3.213-cm) and about 1.275-inch (3.239-cm).

14. The RAF assembly according to claim 10, further comprising: an amount of metallurgical bonding material arranged between the inner surface of the flange and the outer surface of the tube member, the first end of the tube member and the first end portion of the flange being devoid of metallurgical bonding material.

15. The RAF assembly according to claim 14, wherein the metallurgical bonding material comprises a brazing material.

16. An aircraft comprising:
a fuselage extending from a nose portion to a tail portion through a body portion;
first and second wings projecting from the body portion; and
a ram air fan (RAF) assembly mounted within the fuselage, the RAF assembly including a housing including an outer surface and an inner surface that defines an interior portion, a fan housing including a fan motor arranged within the interior portion, and a transfer tube extending between the outer surface and the fan housing, the transfer tube comprising:
a tube member extending from a first end to a second end through an intermediate portion having an outer surface and an inner surface, the outer surface having an outside diameter; and
a flange mounted at one of the first and second ends of the tube member, the flange including a flange body extending from a first end portion to a second end portion through an intermediate section having an outer surface and an inner surface, the inner surface defining an inside diameter, wherein the outside diameter of the tube member is between about 0.010-inch (0.0254-cm) and about 0.030-inch (0.0762-cm) smaller than the inside diameter of the flange, and wherein the flange further includes a first annular rib arranged at the first end portion, a second annular rib arranged proximate to the second end portion, and an annular lip projecting radially inwardly at the first end portion.

17. The aircraft according to claim 16, wherein the outside diameter of the tube member is about 0.020-inch (0.0508-cm) smaller than the inside diameter of the flange.

18. The aircraft according to claim 16, wherein the outside diameter of the tube member is between about 1.245-inch (3.162-cm) and about 1.255-inch (3.187-cm).

19. The aircraft according to claim 16, wherein the inside diameter of the flange is between about 1.265-inch (3.213-cm) and about 1.275-inch (3.239-cm).

20. The aircraft according to claim 16, further comprising: an amount of metallurgical bonding material arranged between the inner surface of the flange and the outer surface of the tube member, the first end of the tube member and the first end portion of the flange being devoid of metallurgical bonding material.

\* \* \* \* \*